April 24, 1928.  O. F. WARHUS  1,667,275

SPRING SUSPENSION FOR VEHICLES

Filed Aug. 6, 1926  2 Sheets-Sheet 1

INVENTOR
Oliver F. Warhus
BY
ATTORNEYS

April 24, 1928.
O. F. WARHUS
1,667,275
SPRING SUSPENSION FOR VEHICLES
Filed Aug. 6, 1926   2 Sheets-Sheet 2
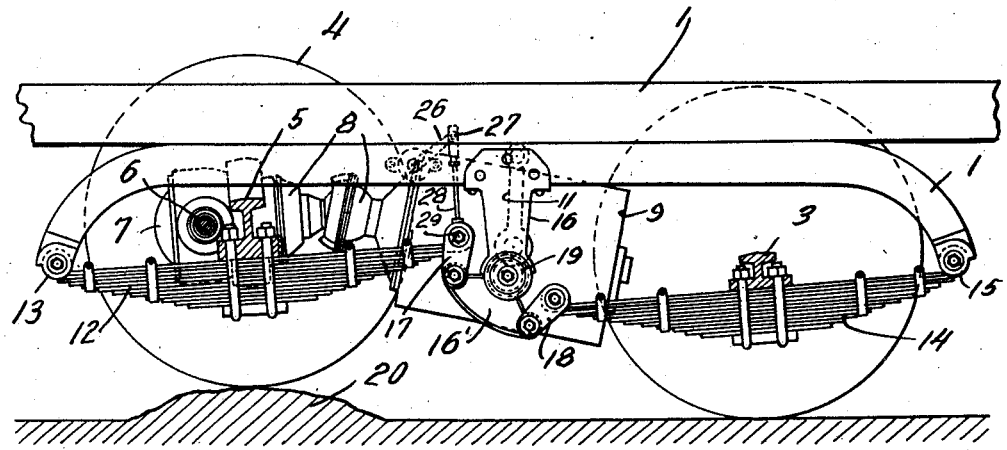
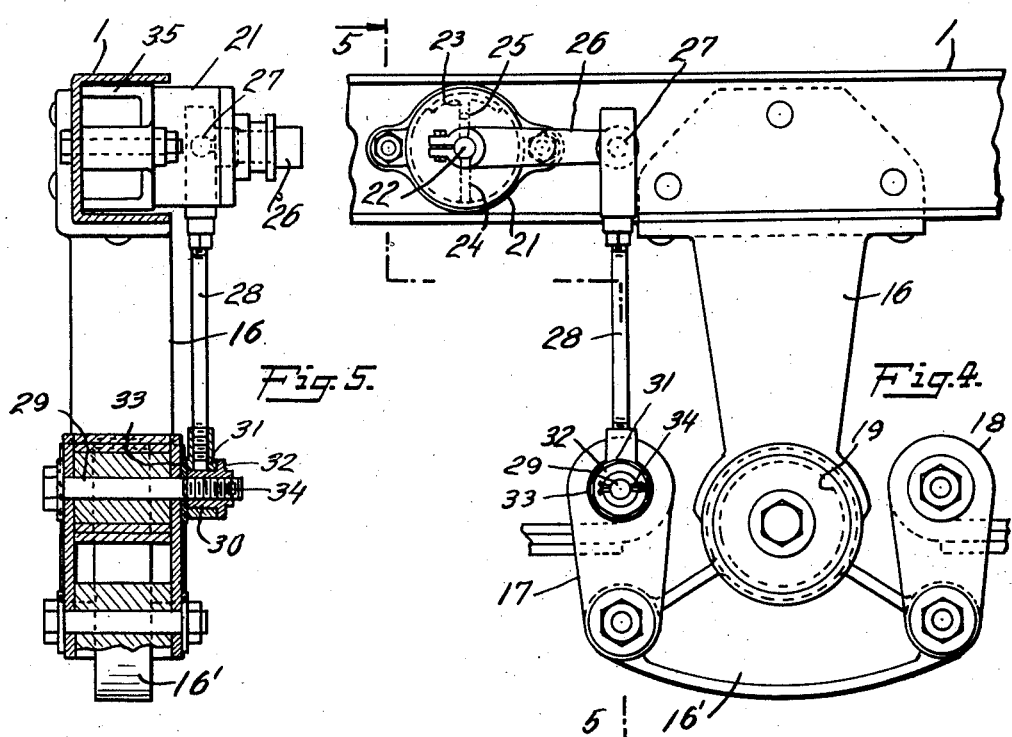
INVENTOR
Oliver F. Warhus
BY
ATTORNEYS Patented Apr. 24, 1928.

1,667,275

UNITED STATES PATENT OFFICE.

OLIVER F. WARHUS, OF ALBANY, NEW YORK, ASSIGNOR TO VERSARE CORPORATION, A CORPORATION OF NEW YORK.

SPRING SUSPENSION FOR VEHICLES.

Application filed August 6, 1926. Serial No. 127,504.

This invention relates to spring suspension systems for vehicles, particularly of the motor driven trackless type.

Large passenger coaches, or so-called busses, are being extensively used in which the body is mounted at the forward and rear ends, or at the rear end alone, on a truck having four wheels. Two or more of the wheels of the truck are usually power driven as by means of an electric motor or internal combustion engine. The spring suspension forming the subject matter of this application was designed especially for use on the trucks of vehicles of the above mentioned character.

One object of the invention is to provide an improved equalizing spring suspension for vehicles of that type in which one part of the body is supported on a set of four wheels, such as a truck, and another part of the body is supported on another set of two or more wheels, such as another truck or a pair of steering wheels, the spring suspension being suitable for use in connection with each set of four wheels.

Other objects will appear from the following description.

The accompanying drawings illustrate the invention applied to a truck intended for use on a six or eight wheel vehicle.

In the drawings:

Fig. 3 is a view corresponding to Fig. 1 showing the position which the parts assume when the rear wheels of the truck are passing over a major obstruction in the road surface;

Fig. 4 is a broken side elevation of the equalizer bar and its associated parts drawn on an enlarged scale; and Fig. 5 is a vertical section taken on the line 5—5 of Fig. 4.

Figure 1:
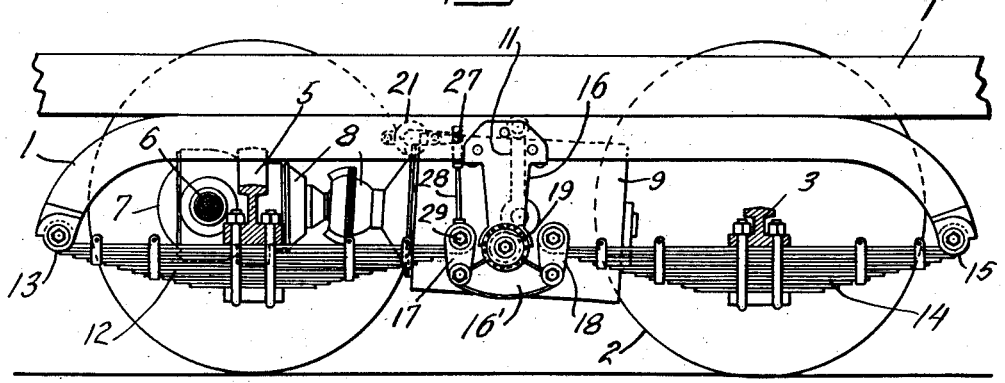
Fig. 1 is a longitudinal section through a truck provided with the improved spring suspension the section being taken on the line 1—1 of Fig. 2.

In the drawings the frame of the truck is represented at 1. The particular truck shown in the drawings is intended to be rigidly attached to the body frame 1' and for this reason the front wheels 2 are mounted on their axle 3 without any provision for steering. If the body frame is pivotally mounted on the truck frame 1 as shown for instance in the patent to Oscar Daniel Schvartz, No. 1,559,050 the front wheels 2 may be steered in the manner shown in that patent. The rear wheels 4 of the truck are mounted on a dead axle 5 and are driven from a live axle 6 geared to the wheels in a manner which forms no part of the present invention. The live axle 6 is driven through differential gearing located in the differential housing 7, the differential gearing in turn being operatively connected with a propeller shaft extending through the housing 8 to an electric motor 9. The motor 9 is pivotally suspended from a subframe 10 of the truck by means of links 11 and the propeller shaft housing 8 together with the propeller shaft are universally jointed to allow them to buckle in the manner shown in Fig. 3 during starting, stopping and braking and when the rear axle vibrates. It will be noted that the universal joint in the housing 8 moves in an arc of a circle which is convex with respect to the motor and it is for this reason that the motor is pivotally suspended by links to permit it to move bodily back and forth. These details of the driving mechanism form no part of the present invention but are claimed in my copending application Serial No. 58,743, filed September 26, 1925.

The rear axle 5 is mounted on a pair of springs 12 which are pivoted at their rear ends to the truck frame 1 as shown at 13. The front axle 3 is likewise mounted on a pair of springs 14 pivoted at their forward ends to the truck frame 1 as shown at 15. The adjacent ends of the springs 12 and 14 are interconnected by equalizing instrumentalities which comprise a depending bracket 16 secured at each side of the truck frame 1 serving as a support for an equalizing bar 16'. The forward end of each rear spring 12 is pivotally connected to the equalizer bar 16' through a shackle 17 and the rear end of each forward spring 14 is likewise pivotally connected to the equalizer bar 16' through a shackle 18. It will be understood that the equalizer bar 16' is pivotally supported by the end of the bracket 16 and is free to swing about an axis 19.

Fig. 3 shows how the equalizing system just described would operate when the rear wheels are passing over an obstruction 20 in the road surface. Under these conditions the rear axle 5 together with the rear springs 12 would be tilted upwardly about the axis of the pivotal connections 13 at the rear ends of the springs. The upward movement of the forward ends of the springs 12 is transmitted through the shackles 17 to the equalizer bars 16' so that they move to the position shown in Fig. 3. The movement of the equalizer bar 16' slightly depresses the rear ends of the front springs while the forward ends of these springs are being slightly raised due to the fact that the truck frame 1 as a whole moves upwardly a slight distance while the above described actions are taking place. The front wheels 2, however, do not leave the ground. It will be understood that when the front wheels 2 pass over an obstruction the operation just described is reversed. In this way the equalizing system operates to absorb to a large degree the shocks which would otherwise be transmitted to the vehicle when the four wheels are on an uneven surface.

Figure 2:
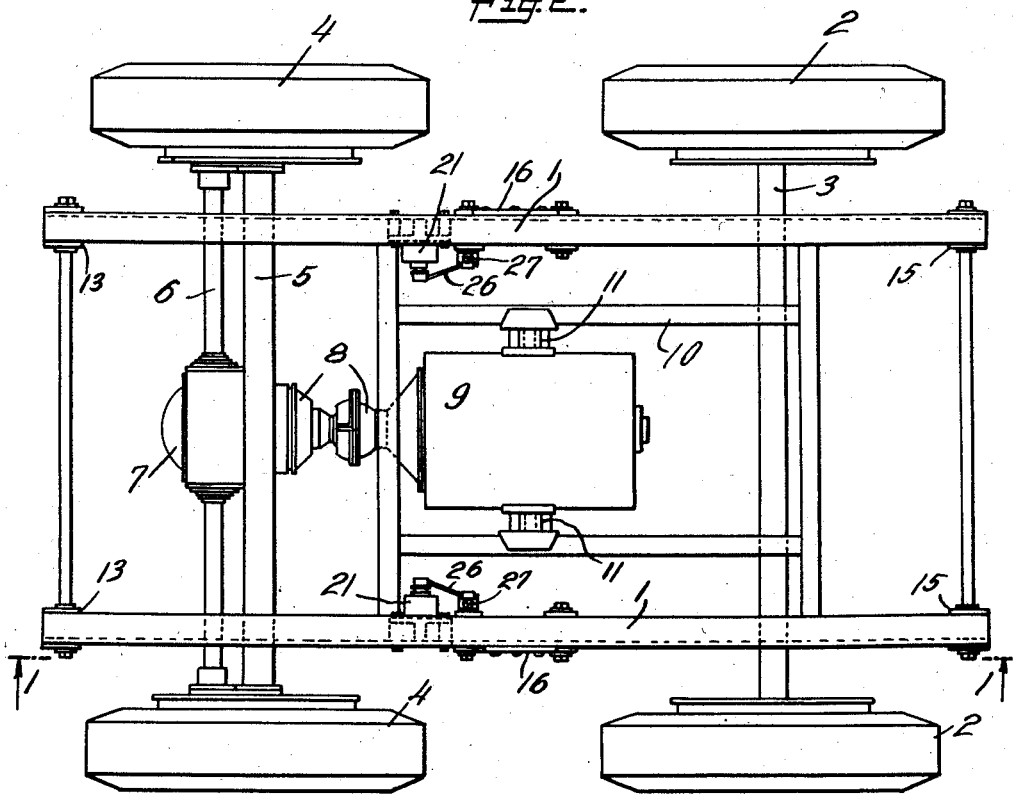
Fig. 2 is a top plan view of the truck shown in Fig. 1.

Under some circumstances it may be desirable to dampen or retard the movement of the equalizing system by the use of so-called shock absorbers 21 in the manner hereinafter described. Ordinarily two shock absorbers will be sufficient one being mounted at the inner side of each longitudinal member of the truck frame 1 as shown in Fig. 2. The shock absorber shown in the drawing, and which is well suited for the purpose, is of a well known type and comprises a casing in which a shaft 22 is mounted to rotate. The casing 21 contains a stationary partition 23 provided with a restricted orifice 25, and the shaft 22 is rigidly connected with a rotary vane 24. The casing of the shock absorber is filled with oil and as the vane 24 rotates in either direction oil is forced through the restricted orifice 25. The result is that quick and sudden movement of the vane 24 is resisted, but it is permitted to move in a slow and gradual manner. Ordinarily the restricted orifice 25 may be regulated so as to determine the speed with which the vane 24 is allowed to move, but the regulating means has not been shown in the drawing as it is a constructional detail of the shock absorber itself and the details of the shock absorber do not form a part of the present invention. The shaft 22 of each shock absorber is provided with an arm 26 which is pivotally connected at 27 to a rod 28. Each of the rods 28 at its lower end is pivotally connected to one of the shackle bolts. A convenient place to attach each rod 28 is to the shackle bolt 29 that connects the forward end of the rear spring to the shackle 17. This may be accomplished in the manner shown in Fig. 5 by making the shackle bolt longer than usual and threading on to the extremity of the bolt a sleeve 30 which constitutes a bearing for a collar 31 associated with the lower end of the rod 28. The sleeve 30 may be provided with a shoulder 32 so that when the sleeve 30 is screwed against a washer 33 an annular seat is formed for the collar 31. The sleeve 30 may be locked in place by means of a cotter pin 34. The longitudinal members of the truck frame 1 are channel shaped in cross section as shown in Fig. 5 and in order to properly locate the shock absorbers and to more conveniently secure them to the frame the casing of each shock absorber is attached to a spacing bracket 35 which in turn is bolted to the bottom of the frame channel.

The shock absorbers work on the dash-pot principle and prevent a sudden and quick movement but allow a slow even movement of the parts connected with them. The equalizing system works satisfactorily without the shock absorbers, but when they are used they increase the tendency for the springs to absorb the minor but sudden and quick jars because the shock absorbers prevent the equalizing system from responding to sudden and quick forces, while any irregularities in the road surface which tend to produce a slower and more gradual movement of the springs brings the equalizing system into operation because the shock absorbers do not materially oppose a relatively slow and gradual spring movement. The shock absorbers have no elastic reaction and therefore have no tendency to restore the parts to their original condition. Their action on the equalizing system is the same at all times regardless of the position of the parts of the equalizing system.

The equalizing spring suspension may be used either in a self-propelled vehicle or one that is not self-propelled. In the self-propelled truck shown in the drawings the rear wheels only are driven but the front wheels may also be driven if desired.

It will be noted that the driving or propelling system shown in the drawings is of the Hotchkiss type as no torque tube or torsion arms are employed and the propelling force is transmitted to the vehicle through the springs. The spring suspension herein disclosed was designed especially for use in this type of drive and when so used it is important that the pivotal connections of the springs to the frame and of the springs to the equalizing bars be of a positive nature. The pivot-pin connections shown in the drawings are positive pivotal connections in the sense indicated. The importance of these positive pivotal connections is due to the fact that they all play an important part in the driving of the vehicle and the pivotal connections must be positive in order to transmit the driving force from one member to the other. However, other types of pivotal connections may be used if the vehicle is not self-propelled by a drive of the Hotchkiss type.

It will be noted that no balancing devices such as springs or the like are used in connection with the equalizing spring suspension to yieldingly maintain the parts in their normal position shown in Fig. 1. For this reason the truck, when not associated with the body of the vehicle, is unstable. For instance, if pressure is applied to one end of the truck frame it can be depressed as the parts of the equalizing spring suspension will not materially oppose this action and will in fact move or alter their positions to permit it. The depression of one end of the truck frame will probably be accompanied by an elevation of the other end of the truck frame. The parts will tend to remain in this position as no restoring devices are employed. Not even the shock absorbers described above function to return the parts to their normal position because they have no elastic reaction. They permit the parts to be moved into any position, so long as they are moved slowly and they have no tendency to return the parts to the position from which they are moved. The spring suspension, therefore, would not be suitable for use in a four wheel vehicle because a weight at one end of the body would depress that end and it would have a tendency to stay there. The spring suspension herein disclosed is suitable for use in connection with a set of four wheels, such as those on a truck, of a vehicle in which another part of the body is supported by another set of two or more wheels. In such a case the body frame is held substantially parallel to the ground by the several sets of wheels and is stable even though the equalizing system for each set of four wheels has no restoring devices. Viewing the matter in another way, the truck frame 1 in Fig. 1 is held in its proper position by the body frame 1', the latter being held in its proper horizontal position because it is supported not only by the set of wheels shown in Fig. 1, but by additional wheels at the other end of the vehicle. The spring suspension herein disclosed is, therefore, self-restoring in a vehicle of the type mentioned, but it would not be self-restoring in a four wheel vehicle.

I claim:

1. In a vehicle a body frame, front and rear sets of wheels on which the body frame is supported, at least one of said sets of wheels comprising a group of four wheels, an equalizing spring suspension system for said group of four wheels comprising a set of rear springs each of which at its rear end has a pivot-pin mounting which is fixed with respect to the body frame, a set of front springs each of which at its forward end has a pivot-pin mounting which is fixed with respect to the body frame, each of said springs being associated with one of the wheels of said group, an equalizing bar between each front and rear spring and having a pivotal mounting which is fixed with respect to the body frame, and shackles connecting each equalizer bar with the adjacent ends of the two corresponding springs, said shackles being connected to the springs and equalizer bar by pivot-pin connections, the parts of said equalizing spring suspension system being unconnected with any device having elastic reaction.

2. In a vehicle in accordance with claim 1 a motor operatively connected with the wheels associated with at least one set of springs, the propelling force of the wheels being transmitted to the frame through the springs.

3. In a vehicle of the type in which one part of the body is supported on a four wheel truck and another part of the body is supported on additional wheels, the combination with the wheels of said truck of an equalizing spring suspension system comprising a set of rear springs each of which at its rear end has a pivot-pin connection with the truck frame, a set of front springs each of which at its forward end has a pivot-pin connection with the truck frame, each of said springs being associated with one of the wheels of the truck, an equalizer bar pivotally associated with the truck frame between each front and each rear spring, and shackles connecting each equalizer bar with the adjacent ends of the two corresponding springs, said shackles being connected to the springs and equalizer bar by pivot-pin connections, the parts of said equalizer spring suspension system being unconnected with any device having elastic reaction.

4. In a vehicle of the type in which one part of the body is supported on a four wheel truck and another part of the body is supported on additional wheels, the combination with the wheels of said truck of an equalizing spring suspension system comprising a set of rear springs each of which is pivotally connected at its rear end to the truck frame, a set of front springs each of which is pivotally connected at its forward end to the truck frame, each of said springs being associated with one of the wheels of the truck, an equalizer bar pivotally associated with the truck frame between each front and each rear spring and pivotally connected to the adjacent ends of said springs, and means free from elastic reaction for retarding the pivotal movement of said equalizer bars, the parts of said equalizer spring suspension system being unconnected with any device having elastic reaction.

5. In a vehicle body frame, a truck frame connected to the body frame so as to be maintained level with respect thereto, front and rear sets of wheels upon which the truck frame is supported, at least one of said sets of wheels comprising a group of four wheels, an equalizing spring suspension system for said group of wheels, front and rear sets of springs associated with the corresponding sets of wheels of the group, a pivot pin connection between the front ends of the front sets of springs and the truck frame, a pivot pin connection between the rear ends of the rear sets of springs and the truck frame, an equalizer bar associated with the truck frame between the inner ends of the springs of each set, and shackles pivotally connecting the equalizing bar with the inner ends of the springs of each set.

In testimony whereof I affix my signature.

OLIVER F. WARHUS.